(12) United States Patent
Kim et al.

(10) Patent No.: US 12,415,751 B2
(45) Date of Patent: Sep. 16, 2025

(54) GLASS PLATE STRENGTHENING DEVICE AND GLASS PLATE STRENGTHENING METHOD USING THE SAME

(71) Applicants: Samsung Display Co., Ltd., Yongin-si (KR); DOWOOINSYS Co., Ltd., Cheongju-si (KR)

(72) Inventors: Hyo-Seop Kim, Anyang-si (KR); Tae-Sik Kim, Gwangmyeong-si (KR); Chanwook Park, Cheongju-si (KR); Hanggyun Park, Suwon-si (KR); Sungeun Boo, Anyang-si (KR); Youngnam Song, Cheongju-si (KR); Jang Doo Lee, Hwaseong-si (KR); Hyungsup Lee, Yongin-si (KR); Kyoungyong Cha, Yongin-si (KR)

(73) Assignees: Samsung Display Co., Ltd., Yongin-si (KR); DOWOOINSYS Co., Ltd., Cheongju-si (KR)

( * ) Notice: Subject to any disclaimer, the term of this patent is extended or adjusted under 35 U.S.C. 154(b) by 364 days.

(21) Appl. No.: 17/861,089

(22) Filed: Jul. 8, 2022

(65) Prior Publication Data
US 2023/0012580 A1 Jan. 19, 2023

(30) Foreign Application Priority Data
Jul. 14, 2021 (KR) .................. 10-2021-0091997

(51) Int. Cl.
*C03C 21/00* (2006.01)
(52) U.S. Cl.
CPC ................. *C03C 21/001* (2013.01)

(58) Field of Classification Search
CPC .......................... C03C 21/001–006
See application file for complete search history.

(56) References Cited

U.S. PATENT DOCUMENTS 8,448,917 B2 * 5/2013 Nagai ............ F16K 3/10
251/327
9,605,903 B2 * 3/2017 Berner ............ F27B 9/029
(Continued)

FOREIGN PATENT DOCUMENTS

| JP | H0322708 Y2 * | 5/1991 | ............... F27B 9/30 |
| KR | 20010083315 A * | 9/2001 | ............... F27D 9/00 |

(Continued)

*Primary Examiner* — Erin Snelting
(74) *Attorney, Agent, or Firm* — Womble Bond Dickinson (US) LLP

(57) ABSTRACT

A glass plate strengthening device includes: a work furnace including a preheating furnace, and a strengthening furnace below the preheating furnace; a transport module configured to transport a glass plate between the preheating furnace and the strengthening furnace in the work furnace; a separator between the preheating furnace and the strengthening furnace, configured to enter and exit the work furnace, and configured to separate or integrate the preheating furnace and the strengthening furnace during entering and exiting; a door module including a door part on a side wall of the work furnace, and configured to provide an entrance space through the door part during the entering and exiting of the separator; and a shield coupled to an outer wall of the work furnace to be adjacent to the door module, and configured to block the entrance space from an external space.

20 Claims, 8 Drawing Sheets

(56) References Cited

U.S. PATENT DOCUMENTS

2010/0282710 A1\* 11/2010 Kitamura ................ F16K 51/02
                                                                    251/329
2020/0247705 A1    8/2020 Palmantier et al.

FOREIGN PATENT DOCUMENTS

| KR | 1000677 B1 | \* | 12/2010 | | |
| KR | 101000647 B1 | \* | 12/2010 | ........... | C03B 27/012 |
| KR | 101120262 B1 | \* | 3/2012 | ............. | C03B 25/02 |
| KR | 10-1141468 B1 | | 5/2012 | | |
| KR | 1143303 B1 | \* | 5/2012 | | |
| KR | 2013095413 A | \* | 8/2013 | | |
| KR | 20130095413 A | \* | 8/2013 | ........... | C03C 21/002 |
| KR | 1333289 B1 | \* | 11/2013 | ............. | C03C 21/00 |
| KR | 1445357 B1 | \* | 10/2014 | | |
| KR | 10-1994791 B1 | | 7/2019 | | |
| KR | 10-2020-0035081 A | | 4/2020 | | |
| KR | 10-2619490 B1 | | 12/2023 | | |

\* cited by examiner

GLASS PLATE STRENGTHENING DEVICE AND GLASS PLATE STRENGTHENING METHOD USING THE SAME

CROSS-REFERENCE TO RELATED APPLICATIONS

The present application claims priority to and the benefit of Korean Patent Application No. 10-2021-0091997, filed on Jul. 14, 2021, the entire content of which is incorporated herein by reference.

BACKGROUND

Aspects of some embodiments of the present disclosure herein relate to a glass plate strengthening device and a glass plate strengthening method using the same, and for example, to a glass plate strengthening device through which product defects may be reduced, and a glass plate strengthening method using the same.

A display device displays images to users and may be incorporated into or utilized in various types of multimedia devices, such as televisions, mobile phones, tablet computers, and game consoles. Display devices include various modules for displaying images. In addition, display devices also include a cover glass for protecting the modules of the display device. Recently, display devices may be designed to have relatively small thicknesses in order to reduce the weight of the display device and improve user's convenience. In addition, the cover glass may also be made to have a relatively small thickness.

Meanwhile, the cover glass may undergo a strengthening process and thus damage to the cover glass due to external shocks may be prevented or reduced. In a chemical strengthening process for strengthening the cover glass, a strengthening device may be used.

The above information disclosed in this Background section is only for enhancement of understanding of the background and therefore the information discussed in this Background section does not necessarily constitute prior art.

SUMMARY

Aspects of some embodiments of the present disclosure include a glass plate strengthening device which, in order to improve product yield, maintains the internal temperature thereof uniformly and prevents or reduces external materials from being introduced thereinto, and a glass plate strengthening method using the glass plate strengthening device.

Aspects of some embodiments of the present disclosure also include a glass plate strengthening device including a cover member which maintains a temperature and prevents or reduces introduction of foreign materials, and a glass plate strengthening method using the glass plate strengthening device.

According to some embodiments of the present disclosure, a glass plate strengthening device includes: a work furnace having a preheating furnace, and a strengthening furnace below the preheating furnace; a transport module configured to shuttle a glass plate between the preheating furnace and the strengthening furnace in the work furnace; a separator between the preheating furnace and the strengthening furnace, configured to enter and exit the work furnace, and configured to separate or integrate the preheating furnace and the strengthening furnace during entering and exiting; a door module having a door part on a side wall of the work furnace, and configured to provide an entrance space through the door part during the entering and exiting of the separator; and a shield coupled to an outer wall of the work furnace to be adjacent to the door module, and configured to block the entrance space from an external space.

According to some embodiments, the shield may include a thermal insulation material.

According to some embodiments, the door part may be opened and closed during the entering and exiting of the separator.

According to some embodiments, the strengthening furnace may store a strengthening solution therein, and include a heating module having a plurality of heat sources configured to heat the strengthening solution.

According to some embodiments, the separator may exit the work furnace as the transport module moves down, and enter the work furnace as the transport module moves up.

According to some embodiments, the door module may further include a controller configured to control movement of the door part.

According to some embodiments, the controller may open the door part when the separator moves, and close the door part when the separator stops.

According to some embodiments, the shield may define a sealed space which the separator enters and exits, and the sealed space may be blocked from the external space.

According to some embodiments, the shield may be attachable to or detachable from the outer wall of the work furnace.

According to some embodiments, the shield may be attached to the outer wall of the work furnace to be detachable when the door part is closed, and to be undetachable when the door part is opened.

According to some embodiments, the glass plate may include a thin film glass having a thickness of about 10 μm to about 100 μm.

According to some embodiments of the inventive concept, a glass plate strengthening method includes: separating a work furnace into an upper preheating furnace and a lower strengthening furnace by introducing a separator into the work furnace; preheating, in the preheating furnace, a glass plate loaded on a transport module; removing the separator from the work furnace to move the separator into a sealed space defined by a shield attached to a side surface of the work furnace; and strengthening the glass plate in the strengthening furnace by moving the transport module downward.

According to some embodiments, the work furnace and the sealed space may be blocked from an external space to be maintained at a constant internal temperature.

According to some embodiments, the shield may include a thermal insulation material.

According to some embodiments, the separating of the work furnace may include moving the separator from the sealed space into the work furnace.

According to some embodiments, a door part may be defined between the sealed space and the work furnace, the door part may be opened and closed by a door module, and the separator may move through the door part.

According to some embodiments, the door part may be on a side surface of the work furnace, and the separating of the work furnace and the removing of the separator may include opening and closing, by the door module, the door part during the moving of the separator.

According to some embodiments, the strengthening of the glass plate may include re-introducing the separator into the work furnace after the transport module moves down.

According to some embodiments, the glass plate strengthening method may further include removing and cleaning the separator, and the cleaning of the separator may include detaching the shield from the work furnace during the removing of the separator.

According to some embodiments, the glass plate strengthening method may further include, after the cleaning of the separator, re-introducing the separator into the work furnace and re-coupling the shield to the work furnace.

BRIEF DESCRIPTION OF THE FIGURES

The accompanying drawings are included to provide a further understanding of embodiments according to the inventive concept, and are incorporated in and constitute a part of this specification. The drawings illustrate aspects of some embodiments of the inventive concept and, together with the description, serve to explain principles of embodiments according to the inventive concept. In the drawings.

DETAILED DESCRIPTION

Figure 1:
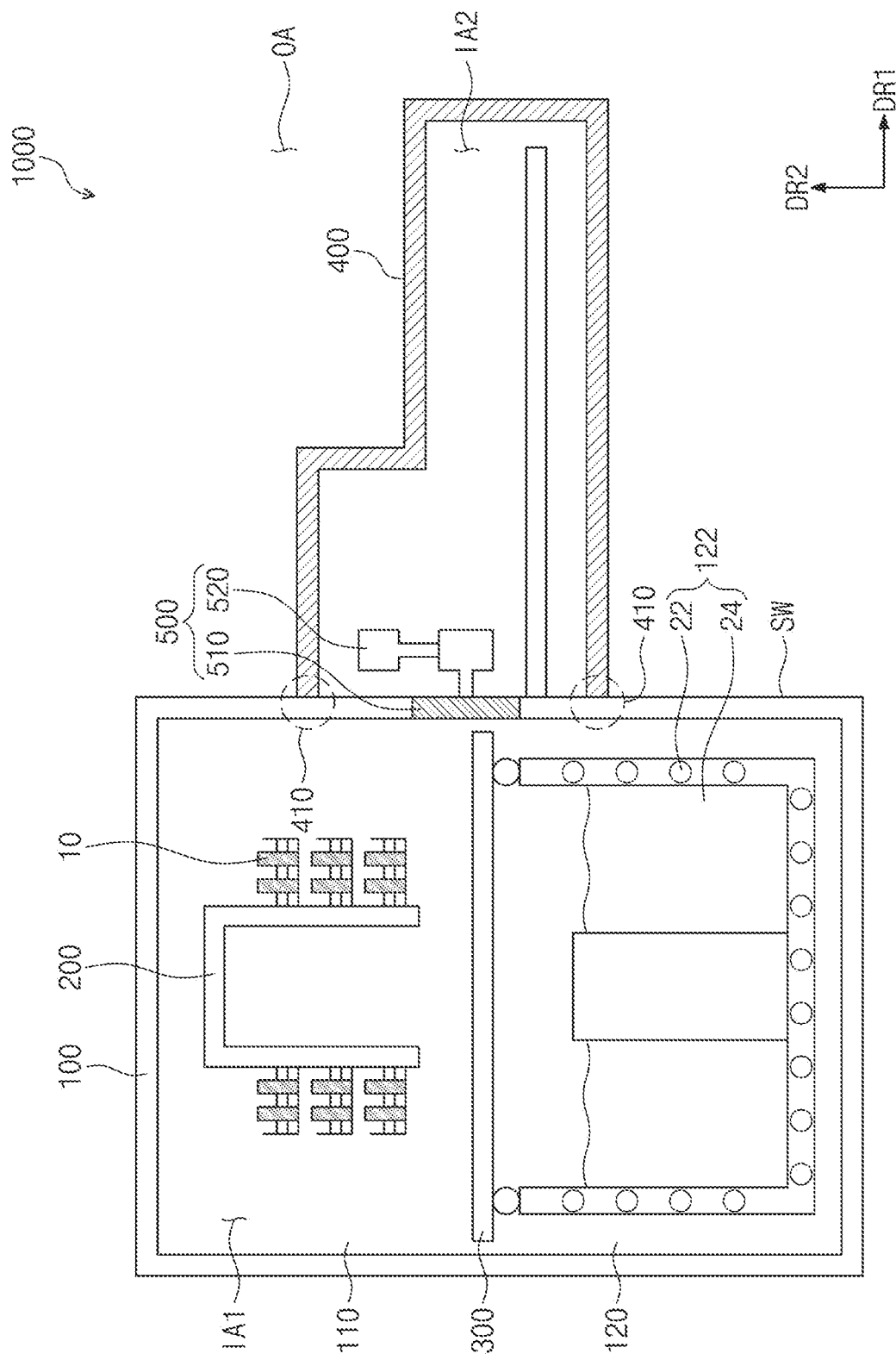
FIG. 1 is a view illustrating a glass plate strengthening device according to some embodiments of the inventive concept.

It will be understood that when an element (or region, layer, section, etc.) is referred to as being "on", "connected to" or "coupled to" another element, it can be arranged directly on, connected or coupled to the other element or a third intervening elements may be located between the elements.

Like reference numbers or symbols refer to like elements throughout. In addition, in the drawings, the thickness, the ratio, and the dimension of elements are exaggerated for effective description of the technical contents. The term "and/or" includes one or more combinations which may be defined by relevant elements.

It will be understood that, although the terms first, second, etc. may be used herein to describe various elements, these elements should not be limited by these terms. These terms are only used to distinguish one element from another element. For example, a first element could be termed a second element without departing from the teachings of the present invention, and similarly, a second element could be termed a first element. As used herein, the singular forms are intended to include the plural forms as well, unless the context clearly indicates otherwise.

In addition, the terms, such as "below", "beneath", "on" and "above", are used for explaining the relation of elements shown in the drawings. The terms are relative concept and are explained based on the direction shown in the drawing.

It will be further understood that the terms such as "includes" and "has", when used herein, specify the presence of stated features, numerals, steps, operations, elements, parts, or the combination thereof, but do not preclude the presence or addition of one or more other features, numerals, steps, operations, elements, parts, or the combination thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the inventive concept will be explained with reference to the accompanying drawings.

FIG. 1 is a view illustrating a glass plate strengthening device according to some embodiments of the inventive concept. FIGS. 2 to 5 are views illustrating respective operations for a glass plate strengthening device according to some embodiments of the inventive concept.

Referring to FIG. 1, a glass plate strengthening device 1000 according to some embodiments includes a work furnace 100, a transport module 200, a separator 300, a shield 400 and a door module 500.

The glass plate strengthening device 1000 may be equipment in which a chemical strengthening process is performed on a plurality of glass plates 10 to enhance the durability of the plurality of glass plates 10. According to some embodiments, the plurality of glass plates 10 may be strengthened in the glass plate strengthening device 1000 and then attached onto a display panel to be utilized as windows (e.g., through which images displayed by the display panel may be viewed by users).

The plurality of glass plates 10 each may be a thin film glass. The thin film glass may be a glass plate having a small thickness of about 10 μm to about 100 μm. The thin film glass may be strengthened via a chemical strengthening process to have durability against breakage or scratches. The plurality of glass plates 10 may be workpieces to be manufactured as strengthened glass plates in the work furnace 100.

The work furnace 100 may be a chamber which provides a first internal space IA1 defined as a work space in which the plurality of glass plates 10 positioned or arranged in the work furnace are strengthened. The first internal space IA1 may be completely separated from an external space OA. That is, the first internal space IA1 is maintained at a temperature different from that of the external space OA. The work furnace 100 may include a preheating furnace 110 and a strengthening furnace 120.

The preheating furnace 110 may be located in one portion of the work furnace 100, and the strengthening furnace 120 may be located in another portion of the work furnace 100. For example, the preheating furnace 110 may be located in an upper portion of the work furnace 100, and the strengthening furnace 120 may be located below the preheating furnace 110.

The preheating furnace 110 may provide a preheating space in which the plurality of glass plates 10 are preheated. The strengthening furnace 120 may provide a strengthening space in which the plurality of glass plates 10, which have been preheated, are strengthened. The plurality of glass plates 10 may be preheated in the preheating furnace 110, moved to the strengthening furnace 120, and strengthened in the strengthening furnace 120.

The strengthening furnace 120 may include a heating module 122. The heating module 122 may be located in the strengthening furnace 120 and may provide a strengthening space therein. The heating module 122 may include a plurality of heat sources 22 and a strengthening solution 24. The strengthening solution 24 may be located in the strengthening space inside the heating module 122, into which the plurality of glass plates 10 are introduced. The plurality of heat sources 22 may surround the strengthening space and may be located on the side surfaces and the bottom surface of the heating module 122. The heating module 122 may heat the strengthening solution 24 thereinside at a temperature higher than that of the preheating furnace 110.

The transport module 200 may be a zig and/or a cassette for loading the plurality of glass plates 10. The transport module 200 may shuttle the plurality of glass plates 10 between the preheating furnace 110 and the strengthening furnace 120. For example, the transport module 200 may transport the plurality of glass plates 10 to the strengthening furnace 120 after a preheating process for preheating the plurality of glass plates 10 in the preheating furnace 110. The number of the plurality of glass plates 10 to be loaded on and transported by the transport module 200 is not limited to the number illustrated in the drawings and the capacity of the transport module 200 and the number of glass plates 10 may vary according to various embodiments to include a greater or lower capacity or number.

The separator 300 may be located between the preheating furnace 110 and the strengthening furnace 120. The separator 300 may spatially separate the preheating furnace 110 and the strengthening furnace 120. The separator 300 may enter and exit the work furnace 100. That is, the separator 300 may spatially separate the preheating furnace 110 and the strengthening furnace 120 when the separator is in the work furnace 100, and spatially integrate the preheating furnace 110 and the strengthening furnace 120 when the separator is outside the work furnace 100.

According to some embodiments, in the work furnace 100, the separator 300 may provide a passage through which the transport module 200 moves. When the separator 300 separates the preheating furnace 110 and the strengthening furnace 120, the transport module 200 may not move, and when the separator 300 integrates the preheating furnace 110 and the strengthening furnace 120, the transport module 200 may freely move between the preheating furnace 110 and the strengthening furnace 120.

The shield 400 may be coupled to an outside wall SW of the work furnace 100. The shield 400 may be coupled to an outer wall of a lateral portion of the work furnace 100. The shield 400 may be coupled to a coupling part 410 in the outside wall SW in various manners. According to some embodiments, the shield 400 may be coupled to the coupling part 410 in an attachable or detachable manner. That is, the shield 400 may be detachable, at the user's discretion, from the coupling part 410 in the outside wall SW of the work furnace 100. For example, the coupling part 410 may provide a frame to which the shield 400 may be coupled. Alternatively, the shield 400 may be coupled to the coupling part 410 in a bolt-fastening mechanism. A coupling mechanism is not limited to being a bolt-fastening mechanism, and may include various other attachable or detachable mechanism.

The shield 400 may provide a second internal space IA2 therein. The second internal space IA2 in the shield 400 may be separated from the external space OA. The second internal space IA2 may be spatially separated, by the door module 500, with the first internal space IA1 in the work furnace 100. The second internal space IA2 in the shield 400 may provide a space which the separator 300 may enter. The separator 300 may shuttle between the first internal space IA1 in the work furnace 100 and the second internal space IA2 in the shield 400.

The door module 500 may provide a passage through which the separator 300 moves. The door module 500 may include a door part 510 and a controller 520.

The door part 510 may be temporarily opened when the separator 300 moves from the first internal space IA1 in the work furnace 100 to the second internal space IA2 in the shield 400, or when the separator moves from the second internal space IA2 to the first internal space IA1.

The controller 520 may automatically open and close the door part 510 according to movement of the separator 300. The door module 500 may be located on the outside wall SW between the work furnace 100 and the shield 400. For example, the door part 510 may be located on the outside wall SW, and the controller 520 may be located on the door part 510.

Referring to FIGS. 2 to 5, the door module 500 may provide an entrance space EA through which the separator 300 may shuttle between the first internal space IA1 and the second internal space IA2.

The shield 400 may be located or arranged adjacent to the entrance space EA. The shield 400 may block the entrance space EA from the external space OA. That is, the shield 400 may seal the entrance space EA. Accordingly, the first internal space IA1, the second internal space IA2 and the entrance space EA may be provided as a sealed space by the shield 400. That is, regardless of whether the door part 510 is opened or closed, the first internal space IA1, the second internal space IA2 and the entrance space EA may be maintained, by the shield 400, at a temperature different from that of the external space OA. In addition, when the door part 510 is opened or closed, introduction of foreign materials from outside of the work furnace 100 into the work furnace 100 may be prevented or reduced.

According to some embodiments, the shield 400 may include a thermal insulation material. Because the shield 400 includes the thermal insulation material, the space in the shield 400 may be maintained at a temperature different from that of the external space OA. The thermal insulation material may include a ceramic board.

Figure 2:
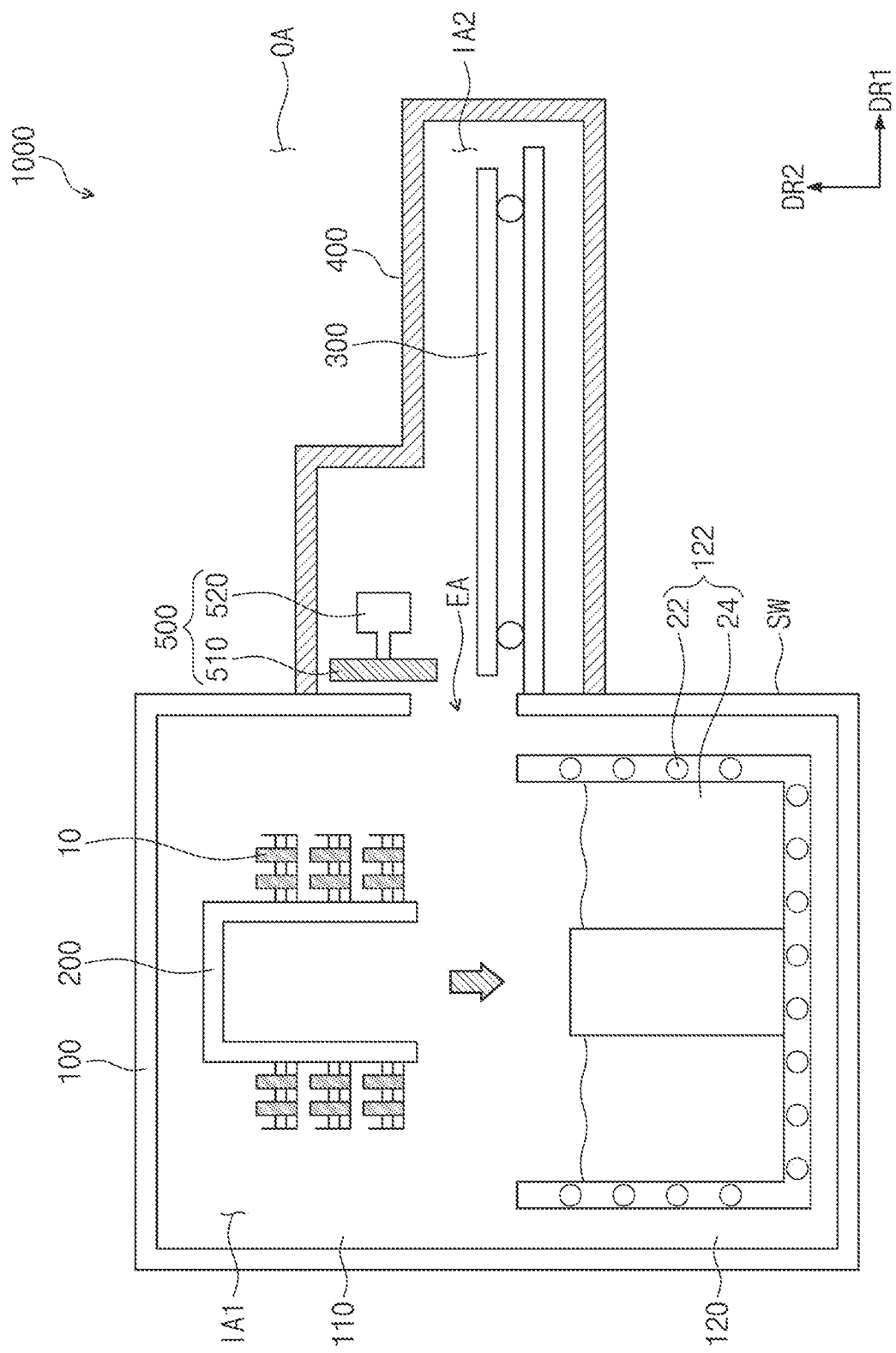
FIGS. 2 to 5 are views illustrating respective operations for a glass plate strengthening device according to some embodiments of the inventive concept.

FIG. 2 is a view illustrating that the plurality of glass plates 10 preheated in the preheating furnace 110 are moved to the strengthening furnace 120 by the transport module 200.

In FIG. 2, the transport module 200 with the plurality of glass plates 10 loaded thereon may be introduced into the strengthening solution 24 inside the heating module 122 of the strengthening furnace 120.

According to some embodiments, the separator 300 may exit the work furnace 100 as the transport module 200 moves down. That is, because the separator 300 needs to be opened, the separator 300 may move through the entrance space EA to the second internal space IA2 in the shield 400. According to some embodiments, the door module 500 may open the door part 510 via the controller 520.

According to some embodiments, the controller 520 controls the door part 510 on the basis of movement of the separator 300. The controller 520 may automatically open the door part 510 when the separator 300 moves, and may automatically close the door part 510 when the separator 300 stops. Accordingly, the door module 500 may be automatically manipulated.

According to some embodiments, the separator 300 may automatically move when the door part 510 is opened via the controller 520. For example, when the door part 510 is opened, the separator 300 may be slid to shuttle between the first internal space IA1 and the second internal space IA2. When the door part 510 is closed, the separator 300 may be maintained to be in a stopped state. That is, the door module 500 may control opening and closing of the door part 510 via the controller 520, and simultaneously, may control movement of the separator 300.

When the preheating is completed in the preheating furnace 110, the separator 300 automatically moves from the first internal space IA1 in the work furnace 100 to the second internal space IA2 in the shield 400 so that the transport module 200 moves down.

Figure 3:
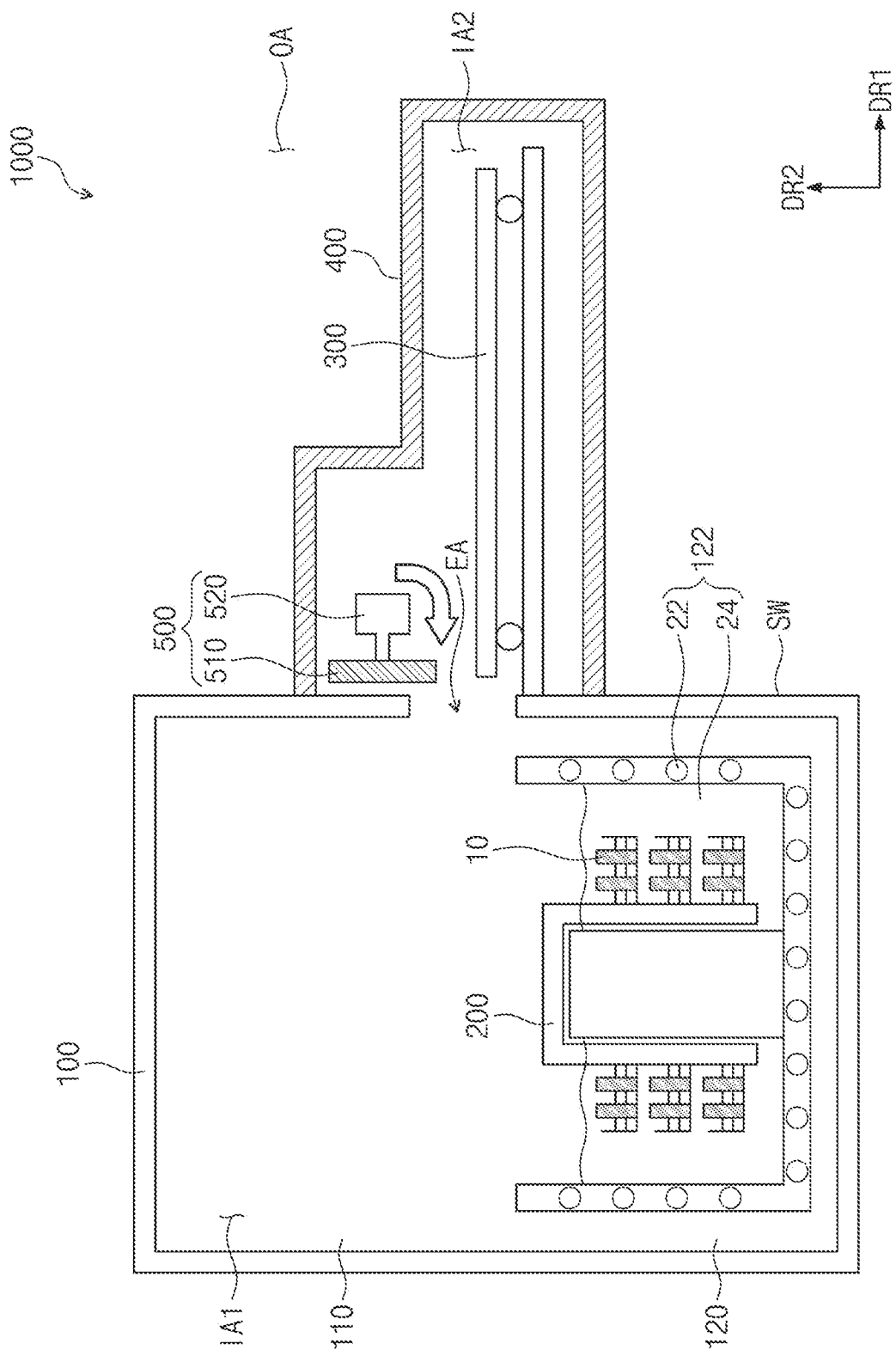

FIG. 3 is a view illustrating that in the strengthening furnace 120, the plurality of glass plates 10 are strengthened in the strengthening solution.

In FIG. 3, when the strengthening of the plurality of glass plates 10 begins in the strengthening furnace 120, the door part 510 may be maintained to be in a closed state. That is, the door module 500 may automatically control the door part 510. The strengthening furnace 120 may be maintained at a constant internal temperature during a strengthening process. It is illustrated that when the plurality of glass plates 10 are strengthened in the strengthening furnace 120, the separator 300 is positioned in the second internal space IA2. However, the separator 300 may be positioned in the first internal space IA1 to separate the strengthening furnace 120 from the preheating furnace 110.

The heating module 122 may heat the strengthening solution 24 via the heat sources 22 to strengthen the plurality of glass plates 10 and thus strengthened glasses may be obtained.

Figure 4:
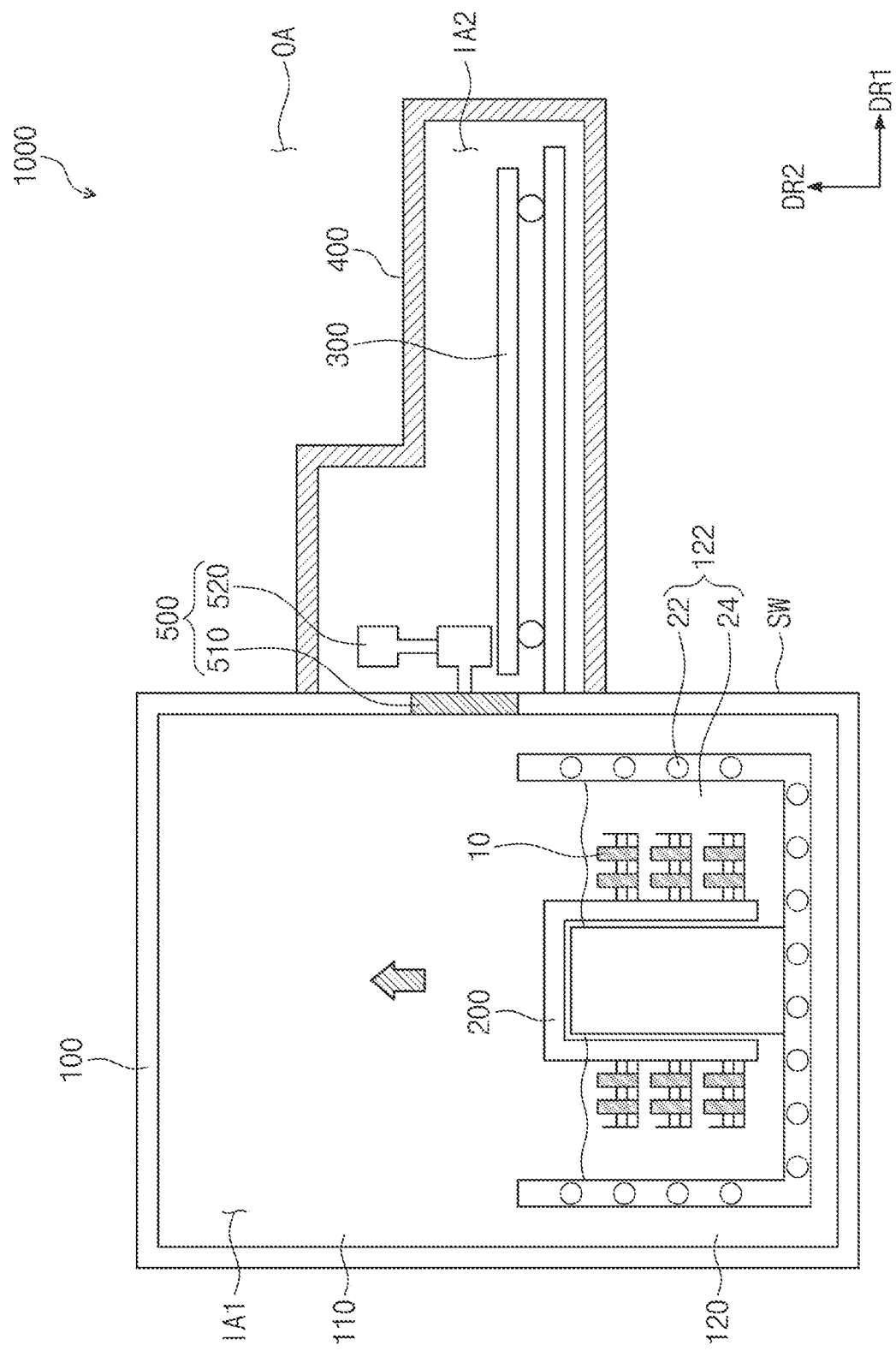

FIG. 4 is a view illustrating that the plurality of glass plates 10, which have been strengthened, move back to the preheating furnace 110 from the strengthening furnace 120.

In FIG. 4, the transport module 200 may move from the strengthening furnace 120 to the preheating furnace 110 in a state where the door part 510 is closed. Here, the separator 300 may be positioned in the second internal space IA2.

Figure 5:
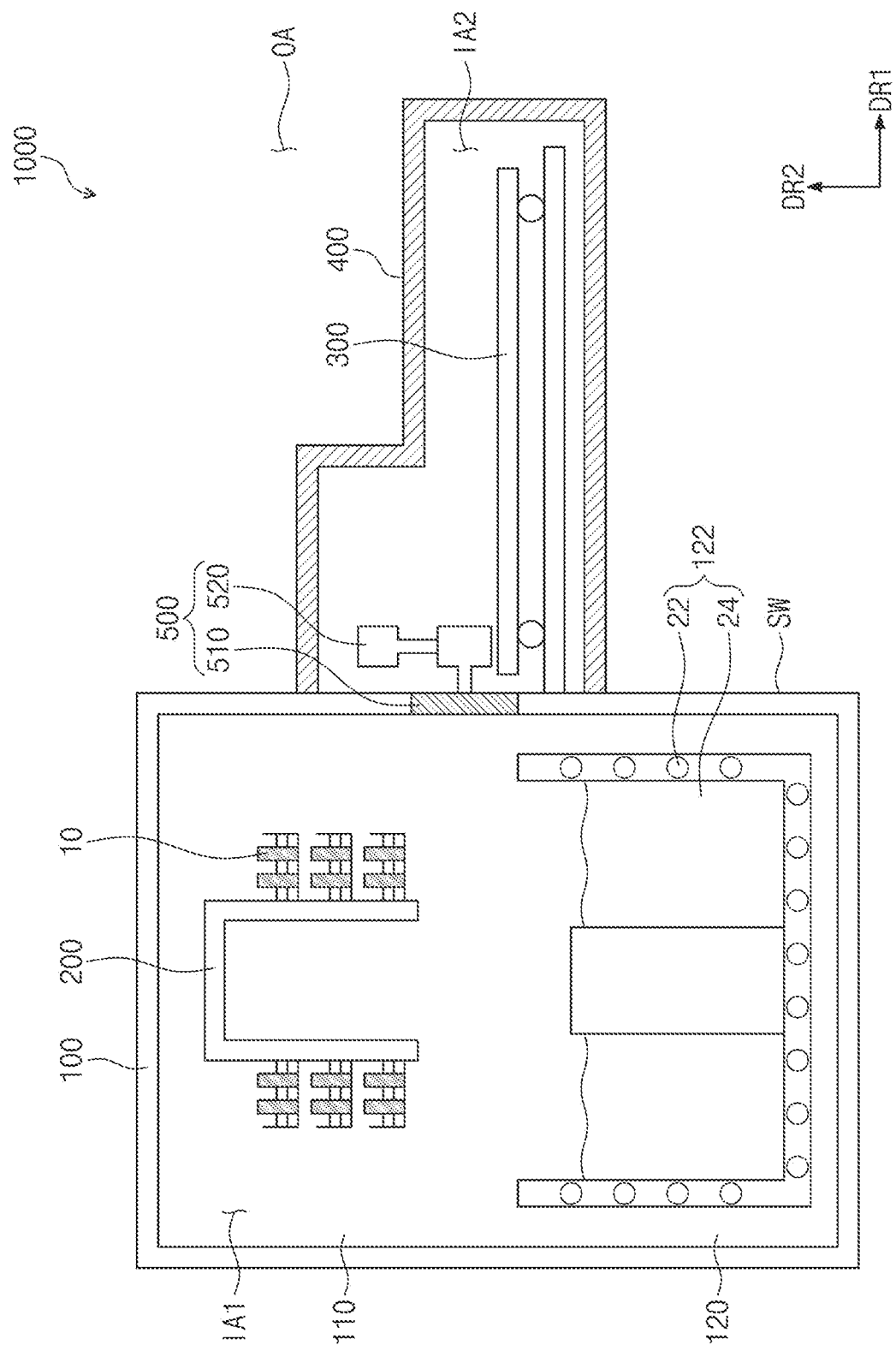

FIG. 5 is a view illustrating the plurality of glass plates 10 returned to the preheating furnace 110 after strengthened. After returned to the preheating furnace 110, the plurality of glass plates 10 may undergo a post-treatment process. For example, the plurality of glass plates 10 may undergo a cooling process in the preheating furnace 110 after strengthened.

Figure 6A:
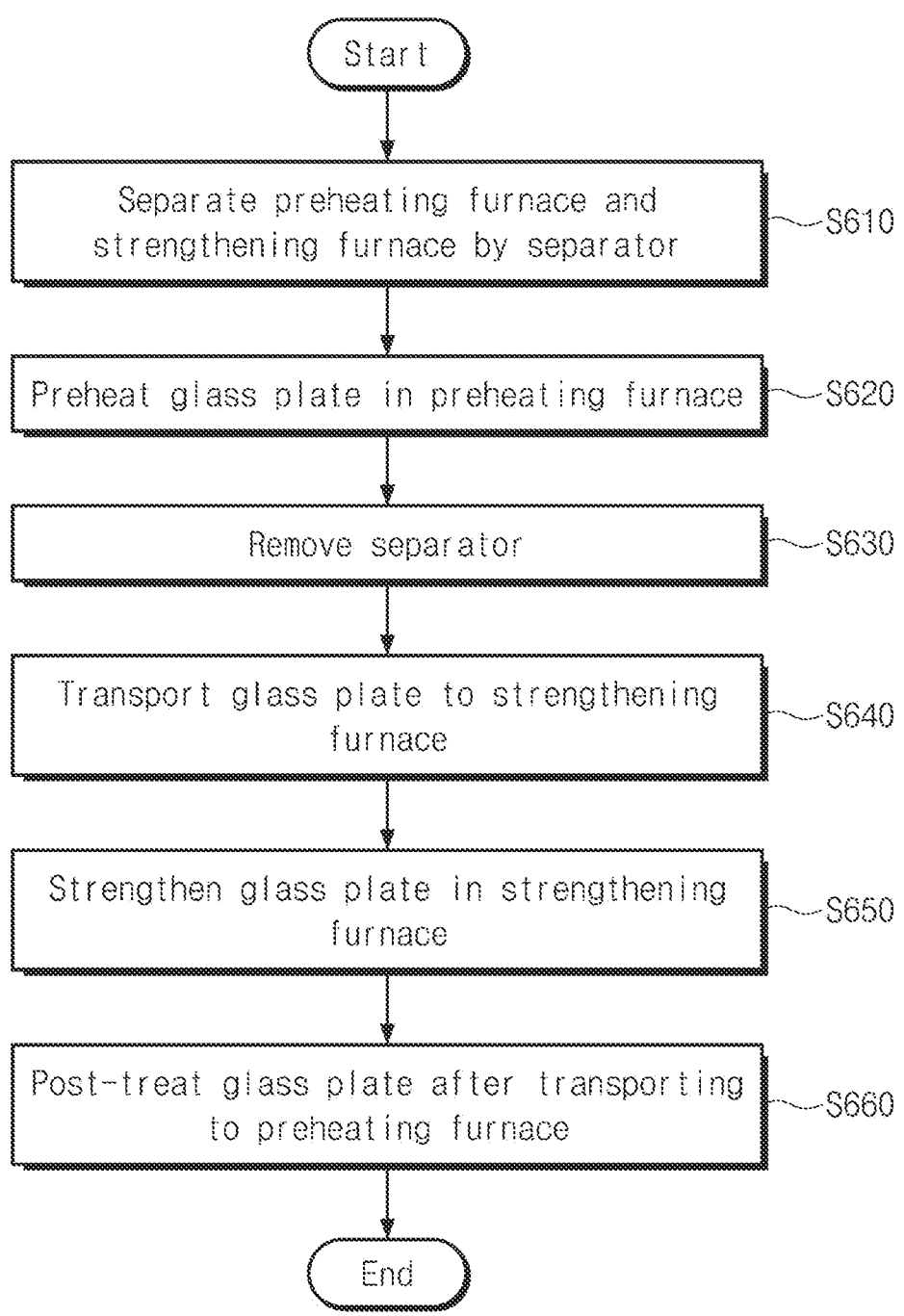
FIGS. 6A and 6B are flowcharts illustrating a glass plate strengthening method according to some embodiments of the inventive concept.
Figure 6B:
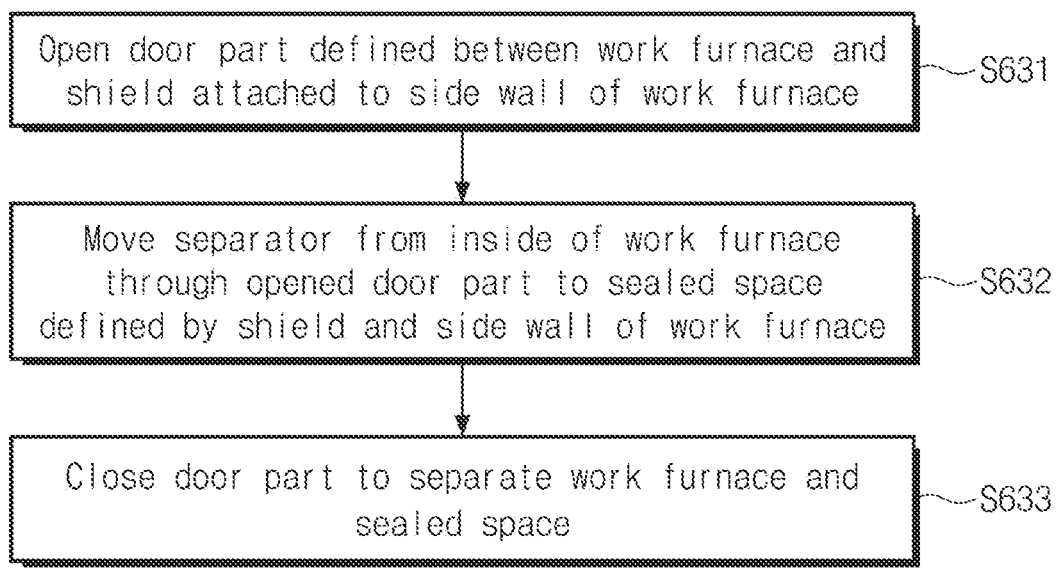

FIGS. 6A and 6B are flowcharts illustrating a glass plate strengthening method according to some embodiments of the inventive concept. FIGS. 6A and 6B are flowcharts illustrating the glass plate strengthening processes in FIGS. 2 to 5.

FIG. 6A illustrates an overall glass plate strengthening method. In the glass plate strengthening method, a separator may be introduced into a work furnace to separate a preheating furnace and a strengthening furnace from each other (S610). According to some embodiments, the separator may be introduced into the work furnace through a door part from a sealed second internal space provided by a shield.

In the preheating furnace, glass plates may be loaded on a transport module and preheated (S620). The separator may be removed from the work furnace (S630). The separator may exit the work furnace and move to a sealed space defined by the shield attached to a lateral outer wall of the work furnace. The transport module may load the glass plates thereon and move down to the strengthening furnace (S640).

The glass plates may be strengthened in the strengthening furnace (S650). According to some embodiments, when the glass plates are introduced into the strengthening furnace, the separator may be re-introduced from the second internal space to a first internal space in the work furnace. That is, in the strengthening, the separator may separate the strengthening furnace from the preheating furnace.

The glass plates strengthened in the strengthening furnace may be returned to the preheating furnace and subjected to a post-treatment such as cooling (S660).

FIG. 6B is a flowchart illustrating the removing of the separator according to some embodiments as illustrated in FIG. 6A.

In FIG. 6B, the removing of the separator may include opening the door part defined between the work furnace and the shield (S631), moving the separator from the inside of the work furnace through the opened door part to the sealed space defined by the shield (S632), and closing the door part (S633). According to some embodiments, the door part may be automatically opened and closed by a door module when the separator moves.

According to some embodiments, the sealed space, through which the separator is moved, is defined by the shield surrounding the door part and attached to a side wall of the work furnace and the side wall of the work furnace. Like the work furnace, the sealed space may be blocked from an external space and maintained at a constant internal temperature. The shield may include various thermal insulation materials including a silicon board.

According to some embodiments, the glass plate strengthening method may further include cleaning the separator.

Figure 7:
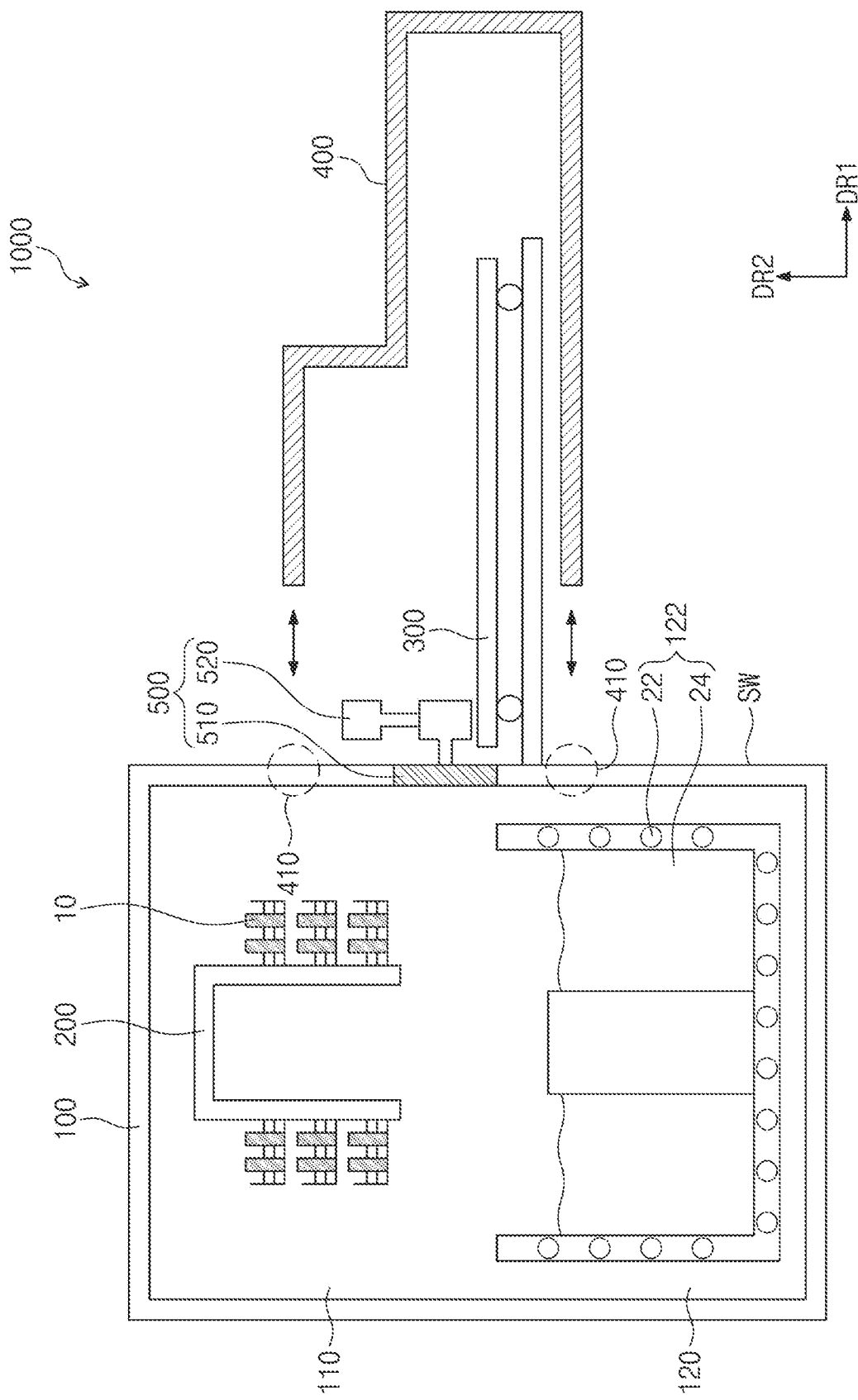
FIG. 7 is a view illustrating a glass plate strengthening device according to some embodiments of the inventive concept.

FIG. 7 is a view illustrating a glass plate strengthening device according to some embodiments of the inventive concept. FIG. 7 is a view illustrating a glass plate strengthening device in cleaning a separator according to some embodiments of the inventive concept.

Hereinafter, the cleaning of a separator will be described in more detail with reference to FIG. 7.

After one strengthening process is completed, a separator 300 may be externally cleaned for a next strengthening process. To be externally cleaned, the separator 300 needs to be removed from a glass plate strengthening device 1000. To remove the separator 300 from the glass plate strengthening device 1000, a shield 400 may be detached. The shield 400 may be relatively easily detached because the shield is attached to an outside wall SW of a work furnace 100 in an attachable/detachable manner.

According to some embodiments, the shield 400 may be attached to the outside wall SW of the work furnace 100 so that the shield is detachable only in a state where a door part 510 is closed. That is, the shield 400 may not be detached in a state where the door part 510 is opened. For example, a door module 500 may cause the door part 510 in the opened state to obstruct a coupling part 410, thereby preventing or reducing instances of detachment of the shield 400. The coupling part 410 may be obstructed by the opened door part 510 or a controller 520.

After being removed and cleaned externally, the separator 300 may be re-introduced into the glass plate strengthening device 1000, and the shield 400 may be re-coupled. Mechanisms for detaching and coupling the shield 400 are not particularly limited.

According to some embodiments, a second internal space IA2 (see FIG. 1) to which the separator 300 moves in the strengthening process is provided as a space separated from a first internal space IA1 in the work furnace 100. The second internal space IA2 may be separated, by the door module 500, from the first internal space IA1. That is, the second internal space IA2 is provided by the shield 400 attached to the outer wall of the work furnace 100. Accordingly, the separator 300 may be removed and cleaned externally because the shield is detached even during the strengthening process of the glass plates 10 performed in a strengthening furnace 120.

A glass plate strengthening device according to some embodiments and a glass plate strengthening method using the same may include a cover member to maintain a uniform temperature in the device and prevent or reduce introduction of foreign materials.

Although aspects of some embodiments of the present invention have been described, it is understood that the present invention should not be limited to these embodiments but various changes and modifications can be made by one ordinary skilled in the art within the spirit and scope of the present invention as defined in the appended claims, and their equivalents.

What is claimed is:

1. A glass plate strengthening device, comprising:
a work furnace including a preheating furnace, and a strengthening furnace below the preheating furnace;
a transport module configured to transport a glass plate between the preheating furnace and the strengthening furnace in the work furnace;
a separator between the preheating furnace and the strengthening furnace, configured to enter and exit the work furnace, and configured to separate or integrate the preheating furnace and the strengthening furnace during entering and exiting;
a door module including a door part on a side wall of the work furnace having a height less than a height of the transport module, and configured to provide an entrance space through the door part during the entering and exiting of the separator laterally through the side wall; and
a shield coupled to an outer surface of the side wall of the work furnace to be adjacent to the door module, and configured to block the entrance space from an external space,
wherein the door module moves along the outer surface of the side wall of the work furnace.

2. The glass plate strengthening device of claim 1, wherein the shield comprises a thermal insulation material.

3. The glass plate strengthening device of claim 1, wherein the door part is configured to be opened and closed during the entering and exiting of the separator, respectively.

4. The glass plate strengthening device of claim 1, wherein the strengthening furnace is configured to store a strengthening solution therein, and comprises a heating module having a plurality of heat sources configured to heat the strengthening solution.

5. The glass plate strengthening device of claim 1, wherein the separator is configured to exit the work furnace as the transport module moves down, and to enter the work furnace as the transport module moves up.

6. The glass plate strengthening device of claim 1, wherein the door module further comprises a controller configured to control movement of the door part.

7. The glass plate strengthening device of claim 6, wherein the controller is configured to open the door part in response to the separator moving, and to close the door part in response to the separator stopping.

8. The glass plate strengthening device of claim 1, wherein the shield defines a sealed space which the separator enters and exits,
the sealed space being blocked from the external space.

9. The glass plate strengthening device of claim 1, wherein the shield is attachable to or detachable from the outer wall of the work furnace.

10. The glass plate strengthening device of claim 9, wherein the shield is attached to the outer wall of the work furnace to be detachable in response to the door part being closed, and to be undetachable in response to the door part being opened.

11. The glass plate strengthening device of claim 1, wherein the glass plate comprises a thin film glass having a thickness of 10 μm to 100 μm.

12. A glass plate strengthening method, the method comprising:
separating a work furnace into an upper preheating furnace and a lower strengthening furnace by introducing a separator into the work furnace;
preheating, in the upper preheating furnace, a glass plate loaded on a transport module;
removing the separator from the work furnace laterally through an opening in a side wall of the work furnace having a height smaller than a height of the transport module to move the separator into a sealed space defined by a shield attached to an outer surface of the side wall of the work furnace;
strengthening the glass plate in the lower strengthening furnace by moving the transport module downward; and
moving a door module along the outer surface of the side wall of the work furnace.

13. The glass plate strengthening method of claim 12, wherein the work furnace and the sealed space are blocked from an external space to be maintained at a constant internal temperature.

14. The glass plate strengthening method of claim 12, wherein the shield comprises a thermal insulation material.

15. The glass plate strengthening method of claim 12, wherein the separating of the work furnace comprises moving the separator from the sealed space into the work furnace.

16. The glass plate strengthening method of claim 12, wherein a door part is defined between the sealed space and the work furnace, the door part is opened and closed by the door module, and the separator moves through the door part.

17. The glass plate strengthening method of claim 16, wherein the door part is on the side wall of the work furnace, and the separating of the work furnace and the removing of the separator comprise opening and closing, by the door module, the door part during the moving of the separator.

18. The glass plate strengthening method of claim 12, wherein the strengthening of the glass plate comprises re-introducing the separator into the work furnace after the transport module moves down.

19. The glass plate strengthening method of claim 12, further comprising removing and cleaning the separator,
wherein the cleaning of the separator includes detaching the shield from the work furnace during the removing of the separator.

20. The glass plate strengthening method of claim 19, further comprising, after the cleaning of the separator, re-introducing the separator into the work furnace and re-coupling the shield to the work furnace.

* * * * *